United States Patent [19]

Gorrell

[11] 4,205,563

[45] Jun. 3, 1980

[54] VARIABLE SPEED TRANSMISSION

[75] Inventor: James M. Gorrell, Morton, Ill.

[73] Assignee: Caterpillar Tractor Co., Peoria, Ill.

[21] Appl. No.: 855,057

[22] Filed: Nov. 25, 1977

Related U.S. Application Data

[63] Continuation of Ser. No. 639,340, Dec. 10, 1975, abandoned.

[51] Int. Cl.² ............................................. F16H 47/00
[52] U.S. Cl. ...................................... 74/730; 74/758; 74/759
[58] Field of Search ................. 74/759, 758, 760, 688, 74/750 R, 730, 764, 761, 730

[56] References Cited

U.S. PATENT DOCUMENTS

| 3,347,113 | 10/1967 | Ramsel | 74/761 X |
|---|---|---|---|
| 3,410,157 | 11/1968 | Livezey | 74/758 |
| 3,877,320 | 4/1975 | Iijima | 74/759 |
| 3,915,033 | 10/1975 | Polak | 74/758 |
| 4,004,473 | 1/1977 | Pearce et al. | 74/759 |

Primary Examiner—C. J. Husar
Assistant Examiner—Frank McKenzie
Attorney, Agent, or Firm—Phillips, Moore, Weissenberger, Lempio & Majestic

[57] ABSTRACT

A transmission combining a plurality of planetary gear arrangements with a torque converter along with various clutching and braking elements provides a broad range of speed reductions with practically identical step ratios between shift ranges thereby efficiently transmitting torque from an input shaft to an output shaft over a broad range of output speeds.

4 Claims, 4 Drawing Figures

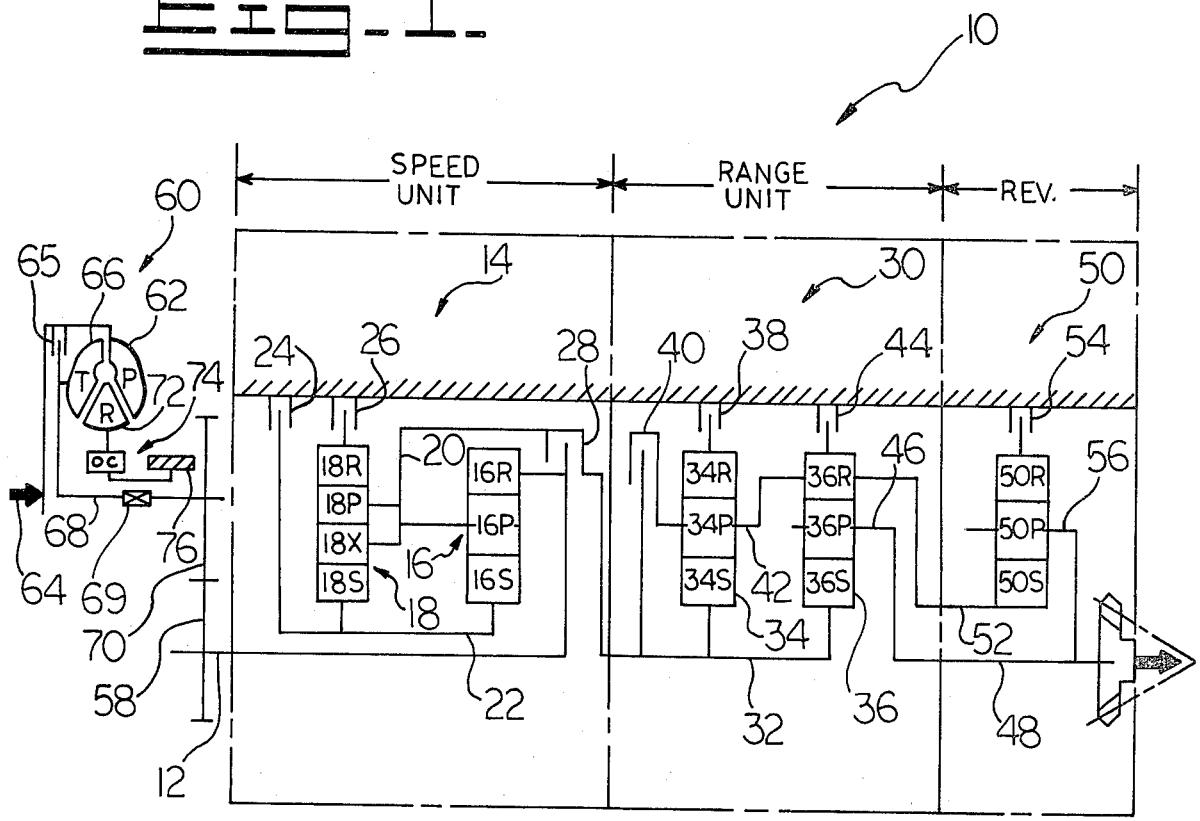

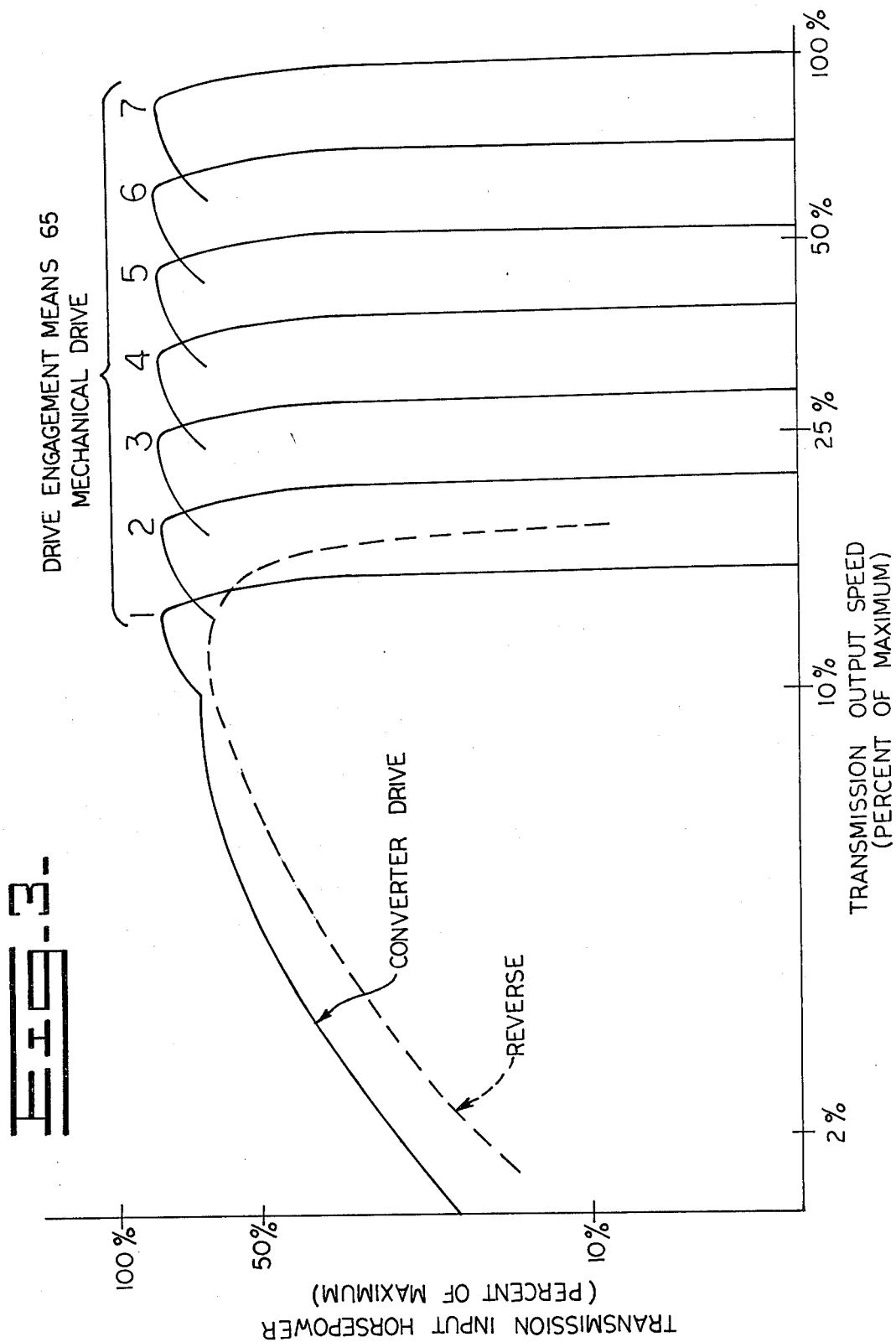

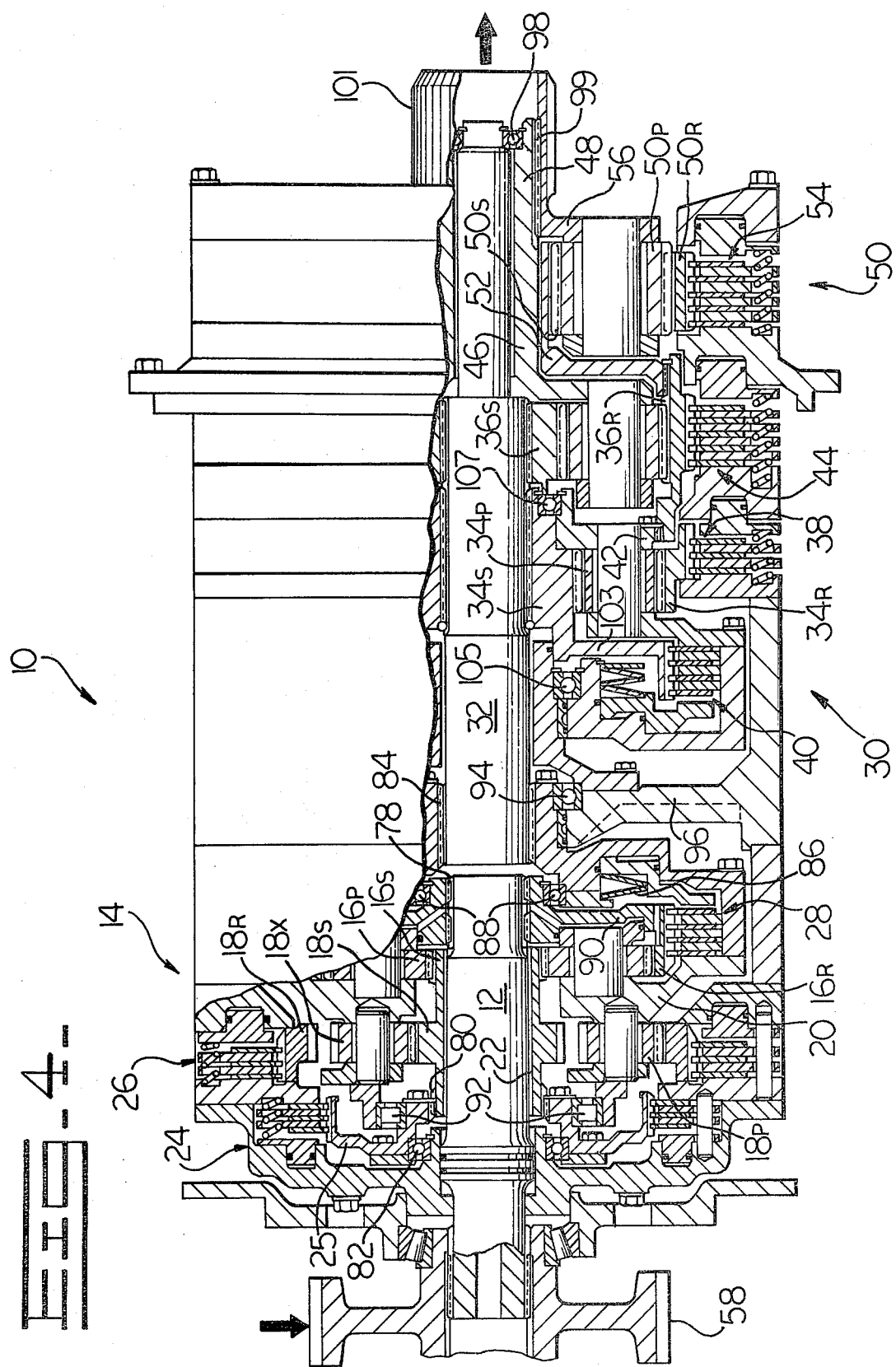

VARIABLE SPEED TRANSMISSION

This is a continuation of Ser. No. 639,340, filed Dec. 10, 1975, now abandoned.

BACKGROUND OF THE INVENTION

This invention relates to a transmission to couple a vehicle engine with the vehicle drive wheels, in particular the transmission disclosed herein combines a torque converter with a plurality of planetary gear arrangements to provide a large number of gear ratios.

Transmission of power from a vehicle engine to the vehicle wheels ideally will allow the vehicle engine to operate at or near a most efficient constant speed throughout the complete range of vehicle speeds. From a practical standpoint this goal is unattainable in view of the fact that the vehicle must be started from a standing position. Furthermore, while using a geared transmission, engine speed must vary throughout the range of the particular gear set engaged. The utilization of a torque converter helps to overcome problems of initial start-up and further provides a broader torque transmission range; however, fluid drive is relatively less efficient than a mechanical drive. A mechanical drive, although more efficient than a fluid drive, requires a relatively high number of gear ratios in order to allow the engine to operate in its most efficient speed range. However, in adding more gear ratios, efficiency is sacrificed through friction losses and the like in inactive gear ratios. Accordingly, compromise transmissions incorporating features of a fluid drive or torque converter and a mechanical transmission have been designed to take advantage of the best characteristics of both transmissions.

A problem encountered in the design and construction of such combination transmissions is the attainment of uniform step ratios between the mechanical shifts. Uniform step ratios are ideally most efficient in such transmissions, as such uniform step ratios eliminate less efficient matches between engine speeds and desired vehicle speed inherent in a transmission which couples large step ratios with smaller step ratios.

An example of a combination torque converter and planetary gear arrangement is found in U.S. Pat. No. 3,347,113 issued to Ramsel on Oct. 17, 1967. Ramsel's patent, which was designed for use in scrapers of the kind used in earthmoving operations, provides six forward speed ratios of mechanical drive at high ground speeds while allowing for a fluid drive at lower ground speeds. Such fluid drive in lower speeds has been found acceptable in scraper operations. Although Ramsel's patent approaches a uniform step ratio, there still remain certain uneven steps. In order to provide more efficient operation at lower speeds required for other types of vehicles, either additional mechanical gear sets must be provided or the arrangement of the various planetary units and the sizing of the planetary elements must be modified to provide constant step ratios throughout a broad range of output speeds. U.S. patent application Ser. No. 420,063 assigned to the assignee of this application adds additional gearing but does not provide the efficient uniform step ratio in the low range.

SUMMARY OF THE INVENTION

Accordingly, this invention is a transmission for a vehicle utilizing four planetary gear sets to provide seven output ratios in the highly efficient mechanical range with almost identical step ratios throughout a broad range of output speeds. Additionally, a torque converter is provided for operation primarily in the first range but also available in any one of the speed ratios, while a fifth planetary arrangement provides a reverse drive.

It is an object of this invention to provide a compact simplified transmission for a vehicle with nearly uniform step ratios throughout a broad range of output speeds.

It is an additional object of this invention to provide a transmission which may be shifted from one range to the next adjacent range with a minimum of clutch or brake engagement and disengagement. These and other objects of the invention and the advantages thereof will be best understood by reference to the following description of the preferred embodiment when taken in conjunction with the accompanying drawings.

BRIEF DESCRIPTION OF THE DRAWINGS

In the accompanying drawings:

FIG. 1 is a schematic diagram of a transmission embodying the invention;

FIG. 2 is a chart showing the particular clutches and brakes which are engaged in a particular embodiment of the transmission of FIG. 1 to establish the different drive ratios provided therein, and which shows the speed reductions, along with the step ratios associated with the speed reductions.

FIG. 3 is a graphical depiction of transmission input horsepower plotted against transmission output speed, and FIG. 4 depicts a transmission partly sectionalized incorporating the provisions of this invention and showing the various gearing, clutching and braking elements.

DETAILED DESCRIPTION OF THE PREFERRED EMBODIMENT

Referring to FIG. 1, a transmission 10 according to this invention is shown schematically. Input to the transmission 10 is provided by shaft 12 driving a speed unit 14 which provides a plurality of reduction ratios and is comprised of a first planetary gear arrangement 16 and a second planetary gear arrangement 18. First planetary gear arrangement 16, driven by input shaft 12, is comprised of a ring gear 16R in intermeshing relationship with a plurality of the first planet gears 16P, which in turn are in intermeshing relationship with a first sun gear 16S. Ring gear 16R is drivingly connected to input shaft 12. Second planetary gear arrangement 18 is comprised of a ring gear 18R, a plurality of intermediate planet gears 18X, a plurality of second planet gears 18P and a sun gear 18S. Sun gear 18S intermeshes with the plurality of intermediate planet gears 18X which intermesh with the plurality of planet gears 18P, while planet gears 18P intermesh with ring gear 18R. A common planet carrier 20 has mounted thereon the plurality of first planet gears 16P and axially separated, but immediately adjacent thereto, intermediate planet gears 18X along with planet gears 18P. First sun gear 16S and second sun gear 18S are integrally formed on a coaxial shaft 22 mounted about shaft 12 to enable first sun gear 16S and second sun gear 18S to rotate together as a unit. A clutch means 28 is provided to directly interconnect input shaft 12 with common carrier 20, common carrier 20 providing input to a range unit 30 by means of a shaft 32. Coaxial shaft 22 is also provided with a brake means 24 allowing selective stopping of rotation of sun gears 16S and 18S to provide a mid-range range output from planetary gear arrangement 16 to common carrier 20. Second ring gear 18R is provided with a brake means 26 allowing selective stopping of rotation of ring gear 18R to provide a low-range split-torque output from planetary gear arrangements 16 and 18 to common carrier 20.

Range unit 30 provides additional reduction ratios and is comprised of a pair of planetary gear arrangements 34 and 36. Mid-range planetary gear arrangement 34 has a mid-range sun gear 34S drivingly connected to shaft 32 while low range planetary gear arrangement 36 has a low range sun gear 36S similarly drivingly connected to shaft 32. Mid-range planetary gear arrangement 34 includes a plurality of mid-range planet gears 34P in intermeshing relationship with mid-range sun gear 34S, and a mid-range ring gear 34R in intermeshing relationship with the plurality of mid-range planet gears 34P. A brake means 38 is provided for selectively stopping of rotation of mid-range ring gear 34R. A clutch means 40 selectively interconnects shaft 32 with the plurality of mid-range planet gears 34P through a mid-range planet carrier 42. Mid-range planet carrier 42 is drivingly interconnected with low range ring gear 36R of low range planetary gear arrangement 36. Low range ring gear 36R is provided with a brake means 44 to allow selective stopping of rotation of low range ring gear 36R. A plurality of low range planet gears 36P completes low range planetary gear arrangement 36, the plurality of low range planet gears 36P intermeshing with low range sun gear 36S and also intermeshing with low range ring gear 36R. The plurality of low range planet gears 36P are rotatingly mounted on a low range planet carrier 46 which is drivingly connected to an output shaft 48.

Range unit 30 is sized so that actuation of brake means 44 to stop rotation of ring gear 36R provides a low range reduction in range unit 30 with output torque delivered from planet carrier 46 to output shaft 48. Actuation of brake means 38 to stop rotation of ring gear 34R provides a mid-range reduction in range unit 30 with output torque delivered through planet carrier 42 to ring gear 36R thence planet gears 36P to planet carrier 46 and output shaft 48. Engagement of clutch means 40 without actuation of either brake means 24 or 26 or clutch means 28 of speed unit 14 provides a neutral range with no transmission of torque, such torque transmitted to ring gear 16 by input shaft 12 being dissipated in speed unit 14. However, engagement of clutch means 40 with an actuated drive engaging device in speed unit 14 results in carrier 42 rotating ring gear 36R at the same speed and in the same direction as sun gear 36S thus rotating planet carrier 46 to transmit torque to output shaft 48.

A reverse drive planetary unit 50, to provide selective reverse rotation of output shaft 48, is coaxially mounted about output shaft 48 and is drivingly connected to low range ring gear 36R by means of a coaxial shaft 52. Reverse planetary unit 50 is comprised of a sun gear 50S drivingly mounted on coaxial shaft 52 and in intermeshing relationship with a plurality of reverse plant gears 50P rotatingly mounted on a reverse planet carrier 56. The plurality of reverse planet gears 50P intermesh with a reverse ring gear 50R of reverse planetary rotation of reverse ring gear 50R and thus provide output to shaft 48 through reverse planet carrier 56 which is drivingly connected to output shaft 48, such output being available only while clutch means 82 is engaged or alternatively while either brake means 24 or 26 is actuated.

Input shaft 12 has mounted thereon a drive gear 58 which may be driven alternatively by the output of a conventional torque converter 60 to provide a fluid drive or directly by a prime mover. Torque converter 60 has a pump element 62 interconnected with an output shaft 64 of an engine (not shown). The turbine element 66 of torque converter 60 is drivingly connected to a turbine shaft 68 which is provided with a universal joint 69 and has mounted thereon a drive gear 70 intermeshing with drive gear 58. Reaction element 72 is provided with a conventional overrunning clutch 74 associated with a stationary structure 76 such as the transmission housing assembly. A drive engagement means 65 is included, interconnecting engine output shaft 64 directly to turbine shaft 68, thereby providing a direct drive from the engine (not shown) to drive gear 70.

Having generally described the schematic arrangement of the transmission, reference is made to FIG. 2 for discussion of the various speed reduction and range reduction ratios with appropriate clutches and brakes engaged. The transmission as described above provides for a possible nine forward speeds by selection of a brake or clutch unit in range unit 30 and selection of a brake or clutch in speed unit 14. In practice, however, it has been determined that seven reduction ratios are sufficient to serve the needs of most transmissions. In the embodiment discussed herein the primary objective is to provide a transmission which has a uniform step ratio over the seven speeds. A second objective of this transmission is to provide a minimum of clutch changes between the various output ranges. These two objectives are attained in this transmission in the three lowest ranges by actuating brake 44 of range unit 30 coupled with actuation of brake 26 for a first range, brake 24 for a second range and clutch 28 for a third range.

The unique arrangement of speed unit 14 is such that in the first range forward when brake 26 is energized, the two planetary gear arrangements 16 and 18 provide a split-torque output. Split torque is available to common carrier 20 from first planet gear 16P in planetary gear arrangement 16 and planet gears 18P and 18X in planetary gear arrangement 18. Particular selection of appropriate gearing in the planetary gear arrangements may provide a reduction ratio of 1.84 in the speed unit as shown in FIG. 2. As noted above, input to speed unit 14 is at ring gear 16R. The planetary gear arrangements of range unit 30 may be proportioned so that actuation of brake 26 in speed unit 14 and brake 44 in range unit 30 in the transmission herein described provides an overall reduction of 6.08, the range unit reduction in low range planetary gear arrangement 36 being adapted to provide a reduction of 3.31 coupled with the aforesaid ratio of 1.84 in the speed unit. In the same application, actuation of brake 24 while maintaining brake 44 in an actuated state may provide a total reduction ratio of 4.4 with this configuration the reduction available in the speed unit being 1.35. Deactivation of brake 24 and actuation of clutch 28 provides a straight through drive in the speed unit with no reduction and thereby the total reduction of the transmission is dependent upon low range planetary gear arrangement 36 or 3.31. It is emphasized that in all three of these low range ratios, brake 44 remains actuated with shifts occurring only as a result of actuation of the brakes or clutch in speed unit 14.

To shift to a fourth range forward, brake 44 is deactuated and brake 38 is actuated both being in range unit 30, along with brake 24 in speed unit 14, the speed unit providing a reduction of 1.34 and the range unit providing a reduction of 1.83 for a total reduction of 2.4. Deactuation of brake 24 and engagement of clutch 28 while retaining brake 38 in an actuated state provides a fifth range forward with the ratios as illustrated in FIG. 2. A sixth range forward is provided by actuation of brake 24 and engagement of clutch 40, while a seventh range is provided by engagement of the two clutches 28 and 40 thereby providing a straight through drive with no reduction.

It is specifically pointed out that by proper proportioning of the various planetary gear arrangements to provide the configuration shown in FIG. 2, the step ratio between the various reduction ratios is practically constant at 1.35, varying to 1.34 only between the third and fourth ratios, which is one of the prime objectives of the transmission. An additional feature of this transmission is, as noted above, that during the first three shifts only one drive engagement means is involved, brake 44 remaining actuated throughout these three shifts, and for the entire seven ranges a total of ten changes in drive engagement means occurs.

Although three reverse ranges are theoretically possible by combining brake 24 or brake 26 or clutch 28 with brake 54, it has been determined that proper ratioing of reverse planetary gear unit 50 provides an adequate reverse range unit reduction, thus the speed unit reduction capability is not utilized in the reverse mode of operation.

Referring to FIG. 3, the specific advantages of the constant or nearly constant step ratios between shifts become apparent when compared with earlier transmissions of multiple drive ratios. FIG. 3 shows graphically the input horsepower plotted against output speed both in percent of maximum. It is evident that once a 10% maximum output speed is achieved, the step ratios of the various mechanical drives are then evely spaced providing a utilization approaching 100% of input horsepower at the peak of each drive ratio and ensuring the most efficient part of each drive ratio, that is, the upper portion of the curves, is fully utilized. Comparison with earlier transmissions show uneven peaks and valleys as compared to the present invention.

Referring to FIG. 4, mechanical construction of a preferred embodiment is illustrated partly in cross section. The torque converter 60, illustrated in FIG. 1 schematically, has not been included in FIG. 4 as such torque converters are well known in the art. In the embodiment envisioned in FIG. 4 a torque converter of the type set forth in U.S. Pat. No. 3,347,113 issued to Ramsel on Oct. 17, 1967 would be applicable to this invention. It is emphasized, however, that the torque converter utilized in U.S. Pat. No. 3,347,113 is not provided with a drive engagement means analogous to drive engagement means 65 shown schematically in FIG. 1 and interconnecting output shaft 64 of the engine (not shown) to turbine shaft 68. Referring again to FIG. 4, drive gear 58 is shown splined to shaft 12, shaft 12 driving ring gear 16R through drive flange 90 by means of spline connection 78. Coaxial shaft 22, which has integrally formed therewith first sun gear 16S and second sun gear 18S, has mounted thereon the rotating member 25 of brake means 24, brake means 24 being of a conventional interleaved disc type, by a spline 80. Rotating member 25 is provided with a bearing 82 to provide free rotation of rotating member 25 in the transmission housing. Common planet carrier 20, in the illustrated embodiment, substantially encompasses first planetary gear arrangement 16 and is interconnected to shaft 32 by a spline connection 84. Clutch means 28, which selectively interconnects shaft 12 with common planet carrier 20, is similarly substantially encompassed by common planet carrier 20. Clutch means 28 is of the conventional rotating interleaved disc type and is provided with resilient means 86 which may be a spring of the Belleville-type urging clutch means 28 to the disengaged state. Common planet carrier 20 is rotatingly mounted by bearing means 88 disposed between common planet carrier 20 and drive flange 90 with drive flange 90 driving first ring gear 16R. Second bearing means 92 is provided at the opposite end of common planet carrier and is disposed between rotating member 25 of brake means 24, which may also be of the interleaved disc type, and common planet carrier 20. A third bearing means 94 is disposed between common planet carrier 20 and portion 96 of the transmission housing which forms a separation between speed unit 14 and range unit 30. Bearing means 94 provides for rotation of common planet carrier 20 and shaft 32.

Range unit 30, as noted above in the discussion relating to FIG. 1, provides output through planet carrier 46 to output shaft 48 which is coaxially mounted about shaft 32. A bearing means 98 allows free rotation of output shaft 48 about shaft 32. Reverse planet carrier 56 is splined to output shaft 48 by spline connection 99, and may have integrally formed therewith an output spline 101. Planetary units 34 and 36 are mounted about shaft 32 with sun gears 34S and 36S splined thereto.

Sun gear 34S which is splined to shaft 32 has extending outwardly therefrom a flange 103 with which clutch means 40 is associated. Engagement of clutch means 40 therefore associates shaft 32 through sun gear 34S with planet carrier 42 of range unit 30. A bearing means 105 is provided between planet carrier 42 and portion 96 of the transmission housing which along with a bearing means 107 located on the opposite side of sun gear 34S allows free rotation of planet carrier 42. Brake means 38 and brake means 44 may be of the interleaved disc type and are associated with the transmission housing to stop rotation of ring gears 34R and 36R respectively.

Operation of the preferred embodiment should be evident from the discussion of the structure above; however, certain points of operation are herein reiterated. Initially it is pointed out that the transmission may be operated with the torque converter providing input to drive gear 58 or by a direct connection between engine output shaft 64 and drive gear 58, by engagement of clutch 65. Other than operation in first range forward and seventh range forward, the transmission utilizes one or two planetary gear arrangements to accomplish the necessary reduction. In the first range forward, a split torque output is provided by engagement of brake means 26 and brake means 44. Thus first planetary gear arrangement 16 and second planetary gear arrangement 18 combine to provide output torque to shaft 32 which in turn drives low range planetary gear arrangement 36 through sun gear 36S. In the seventh range forward, engagement of clutch 28 and clutch 40 provides a direct drive through both the speed unit 14 and range unit 30 to output shaft 48.

While the invention has been described with respect to a single embodiment, it will be apparent that many modifications are possible and it is not intended to limit the invention except as defined in the following claims.

I claim:

1. A transmission comprising
    an input member;
    a driven member;
    a torque converter including a pump element, a turbine element, and a reaction element; the pump element driven by said input member;
    a first planetary gear assembly including a first sun gear, a plurality of first planet gears, and a first ring gear, each of said first planet gears intermeshing with said first sun gear and said first ring gear;
    drive means drivingly interconnecting said turbine element with said first ring gear;
    clutch means selectively engageable for drivingly connecting said input member with said drive means;
    a second planetary gear assembly including a second sun gear integrally formed with said first sun gear of said first planetary gear assembly, a second planet gear arrangement, and a second ring gear;
    said second planet gear arrangement comprising a plurality of intermediate gears each intermeshing with said sun gear and a plurality of second planet gears each intermeshing with a matching intermediate gear and said second ring gear;
    a common planet carrier having rotatingly mounted thereupon said first planet gears and said second planet gear arrangement, said common planet carrier drivingly connected with the driven member;
    first brake means selectively actuable for stopping rotation of said second ring gear so that said first planetary gear assembly and said second planetary gear assembly operate in a split torque relationship transmitting torque applied to said first ring gear from said first input member to said driven member through said common planet carrier;
    second brake means selectively actuable for stopping rotation of said first and said second sun gears so that torque applied to said first ring gear is transmitted to said driven member through said common planet carrier;
    a second clutch selectively engageable for directly connecting the drive means with the driven member so that speed of rotation of said driven member is equal to the speed of rotation of said drive means;
    said driven member comprising a plurality of planetary gear assemblies; an output shaft; a plurality of drive engagement means selectively actuable for drivingly associating said common planet carrier with said output shaft whereby speed of rotation of said output shaft is at most equal to the speed of rotation of said common planet carrier; and a reverse planetary gear assembly including a sun gear drivingly connected to the plurality of planetary gear assemblies, a plurality of reverse planet gears, a reverse planet carrier having mounted thereon said plurality of reverse planet gears, a reverse ring gear, and reverse brake means actuable for selectively stopping rotation of said reverse ring gear; said plurality of reverse planet gears intermeshing with said reverse sun gear and said reverse ring gear; and said reverse planet carrier drivingly connected to said output shaft;
    wherein said plurality of planetary gear arrangements comprises a low range planetary gear arrangement and a mid-range planetary gear arrangement, said low range planetary gear arrangement comprising a low range sun gear drivingly connected with said common planet carrier, a low range planet carrier, a plurality of low range planet gears rotatingly mounted on said low range planet carrier, and a low range ring gear; said mid-range planetary gear arrangement comprising a mid-range sun gear drivingly connected with said common planet carrier, a mid-range planet carrier, a plurality of mid-range planet gears rotatingly mounted on said mid-range planet carrier and a mid-range ring gear; said mid-range planet carrier drivingly connected with said low range ring gear, and said low range planet carrier drivingly connected with said output shaft, and said low range ring gear drivingly connected with the reverse sun gear, the transmission further comprising range clutch means selectively actuable for drivingly connecting the common planet carrier with the mid-range planet carrier.

2. The transmission as set forth in claim 1 wherein the first planetary gear assembly is sized and adapted so that at a constant speed of rotation of said drive means, speed of rotation of said driven member is relatively slower with said first brake means actuated than with said second brake means actuated, and further with said second brake means actuated speed of rotation of said driven member is slower than said constant speed of rotation of said input member.

3. A transmission comprising:
    an input member;
    a torque converter having a pump section driven by the input member, a reaction section, a turbine section and a torque converter output assembly driven by said turbine section;
    a torque converter clutch means operable for selectively interconnecting the input member with the torque converter output assembly;
    a speed unit comprised of a speed unit input shaft driven by said torque converter output assembly, first planetary gear assembly having a first sun gear, a common speed unit planet carrier, a plurality of first planet gears mounted on said common speed unit planet carrier and intermeshing with said first sun gear, and a first ring gear intermeshing with said plurality of first planet gears and driven by the speed unit input shaft, a second planetary gear assembly having a second sun gear integrally formed with said first sun gear, a second planet gear arrangement including a plurality of intermediate gears rotatingly mounted on the common speed unit planet carrier intermeshing with the second sun gear and a plurality of second planet gears rotatingly mounted on the common speed unit planet carrier and intermeshing with the plurality of intermediate gears, and a second ring gear intermeshing with the plurality of second planet gears, a first brake means selectively actuable for stopping rotation of said second ring gear; and a second brake means selectively actuable for stopping rotation of said first and second sun gears, and a first clutch selectively actuable to engage said speed unit input shaft with said common speed unit carrier; and
    a driven member rigidly connected with said common speed unit planet carrier;
    the first and second planetary gear assemblies sized and adapted so that at a constant speed of rotation of said input member actuation of said first brake means causes a portion of said driven member to rotate at first speed slower than said input member and actuation of said second brake means causes a portion of said driven member to rotate at a second speed slower than said input member, said first speed relatively slower than said second speed;

said driven member comprising an output member and a range unit including:

a range unit input shaft comprising the portion of the driven member drivingly connected to the common speed unit carrier;

a mid-range planetary assembly having a mid-range sun gear drivingly mounted on said range unit input shaft, a mid-range planet carrier, a plurality of mid-range planet gears, and a mid range ring gear;

a low range planetary gear assembly having a low range sun gear drivingly mounted on said range unit input shaft, a low range planet carrier driving said output member, a plurality of low range planet gears rotatingly mounted on said low range planet carrier and intermeshing with said low range sun gear and a low range ring gear intermeshing with said plurality of low range planet gears and drivingly connected with said mid-range planet carrier;

mid-range brake means for selectively stopping rotation of said mid-range ring gear;

low range brake means for selectively stopping rotation of said low range ring gear; and a second clutch for selectively engaging the range unit input shaft with said mid-range planet carrier.

4. The transmission as set forth in claim 3 further comprising a reverse planetary gear arrangement having a reverse sun gear driven by the low range ring gear, a reverse planet gear arrangement drivingly connected to the output member, a reverse ring gear, and a reverse brake for selectively stopping rotation of the reverse ring gear.

* * * * *